H. F. SNYDER.
MANURE SPREADER.
APPLICATION FILED OCT. 22, 1906.
1,034,396.
Patented July 30, 1912.
3 SHEETS—SHEET 2.
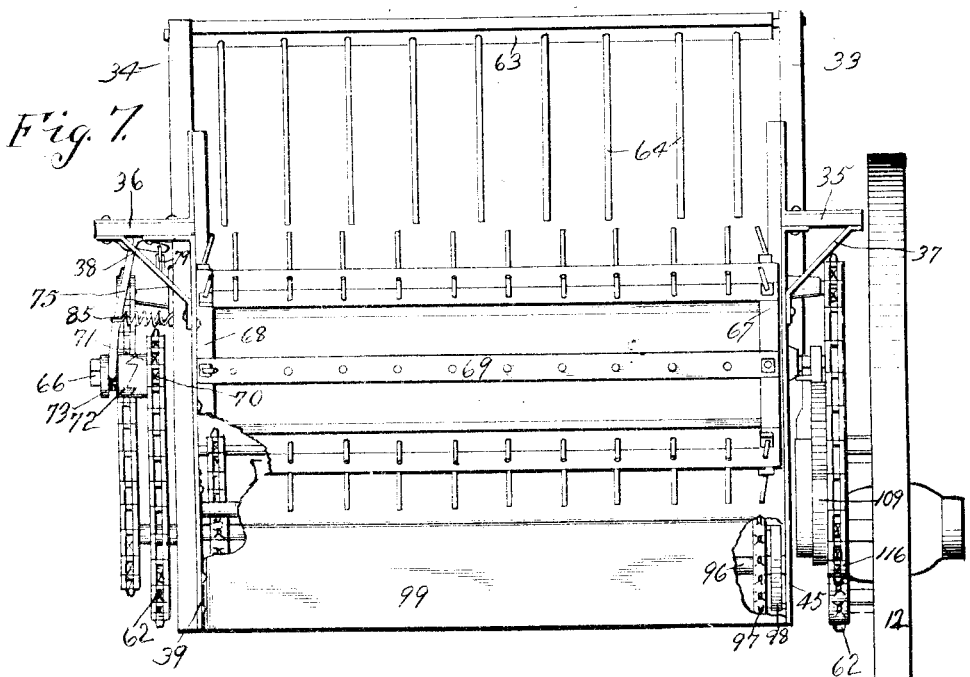
Fig. 7.
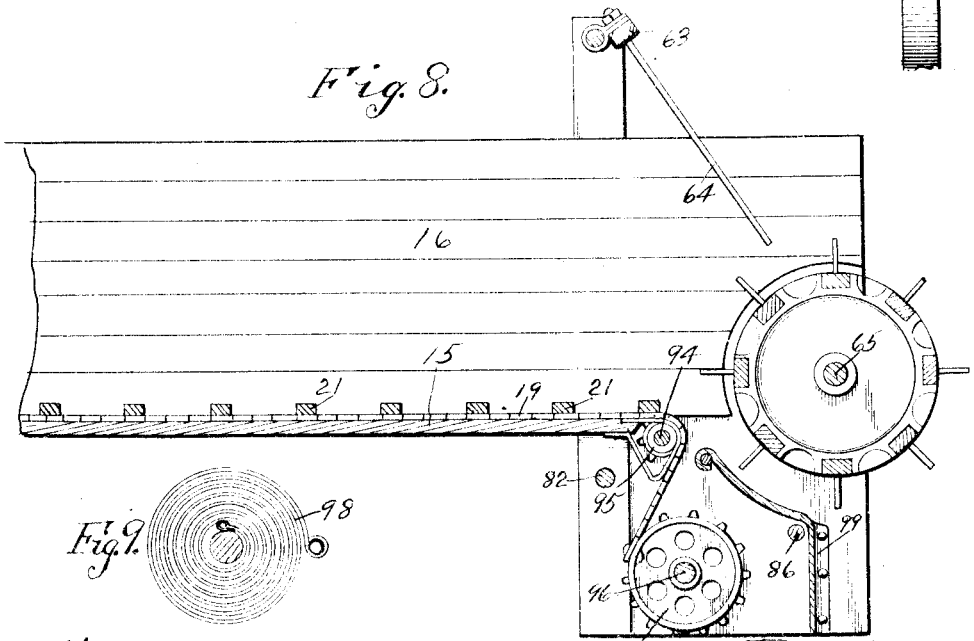
Fig. 8.
Fig. 9.
Witnesses
A. G. Hague
K. K. Keffer
Inventor
H. F. Snyder
by Owig & Lane atty.

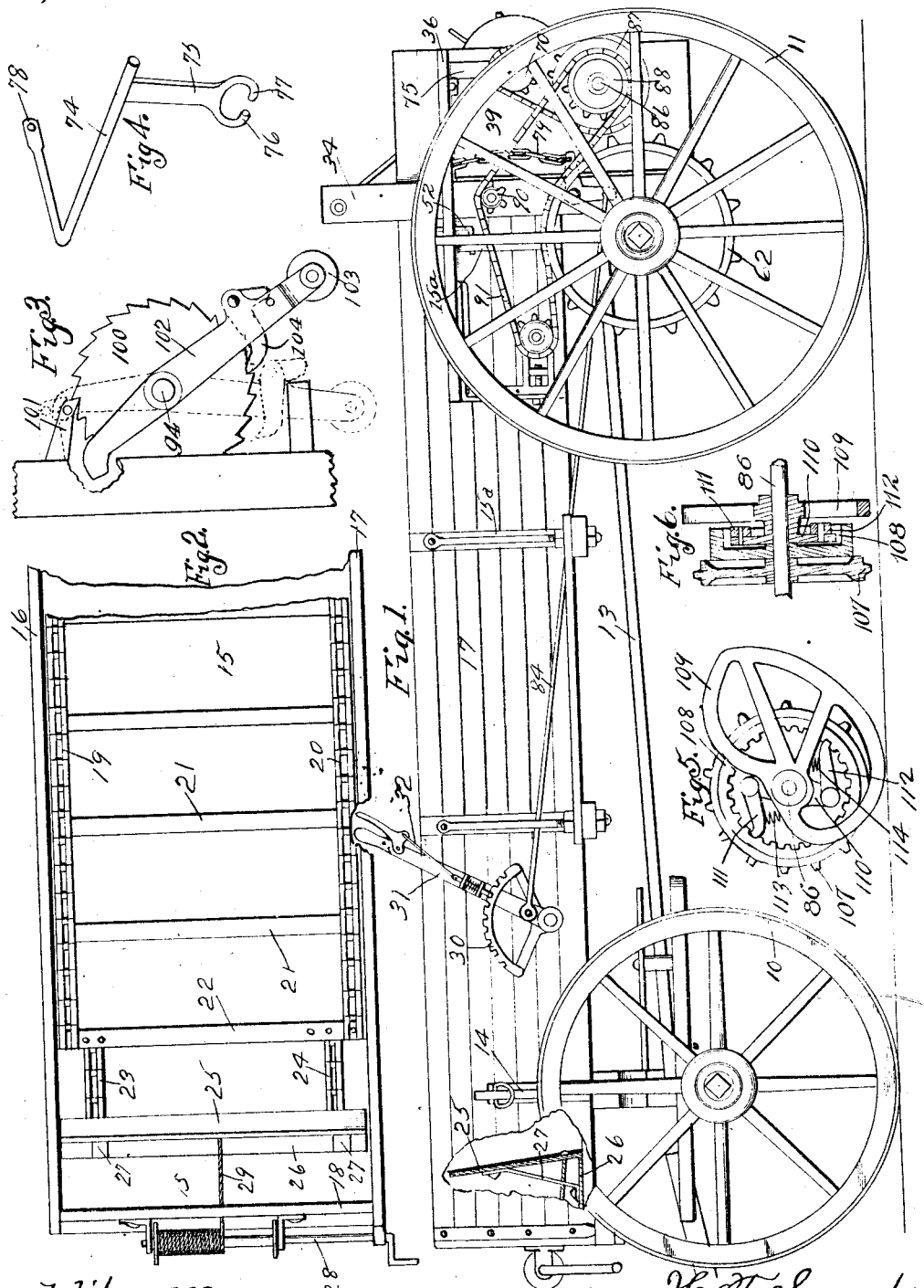

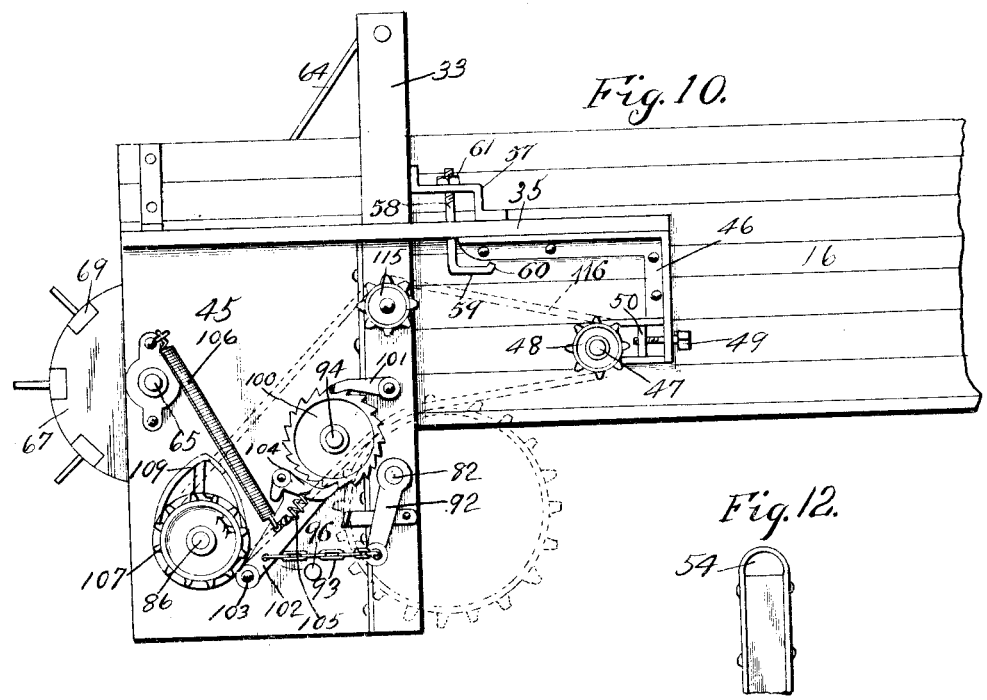
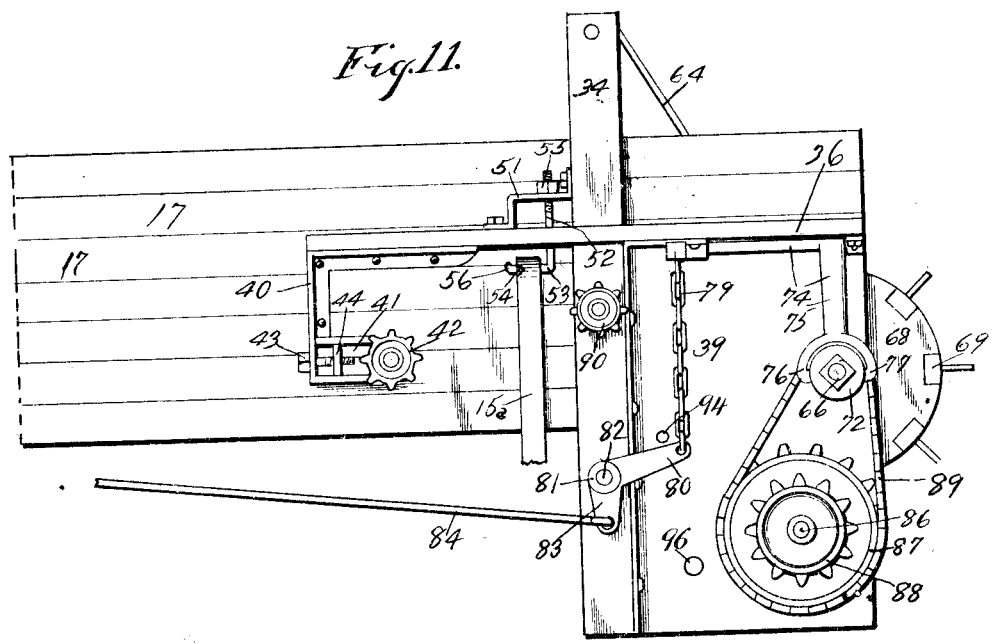

UNITED STATES PATENT OFFICE.

HOWARD F. SNYDER, OF NEWTON, IOWA, ASSIGNOR TO FRED L. MAYTAG, OF NEWTON, IOWA.

MANURE-SPREADER.

1,034,396.  Specification of Letters Patent.  Patented July 30, 1912.

Application filed October 22, 1906. Serial No. 340,090.

*To all whom it may concern:*

Be it known that I, HOWARD F. SNYDER, a citizen of the United States, residing at Newton, in the county of Jasper and State of Iowa, have invented a certain new and useful Manure-Spreader, of which the following is a specification.

The objects of my invention are to provide a manure spreader to be used in connection with the running gear of the ordinary farm wagon and so constructed and arranged that its body will take the place of the ordinary wagon box and it is so arranged that the operative portions of it are driven by the rear wheels of the wagon.

A further object is to provide a driving mechanism for the apron of the spreader which together with the beater are controlled in their operation by a single lever designed to be manually operated by the driver from a position near the forward end of the body of the spreader.

A further object is to provide a mechanism operatively connected with the lever near the forward end of the body by which the speed of the apron is controlled.

A further object is to provide a mechanism for rolling up the apron at the rear end of and below the floor of the body which is operated largely by the downward movement of the apron.

A further object is to provide a manually operated mechanism for returning the apron to its normal position in the body.

A further object is to provide rigidly braced supporting plates at the rear end of the body designed to prevent the operative parts of the device from getting out of repair.

A further object is to provide a beater designed to force the manure in the wagon over it in small quantities to a point of discharge.

A further object is to provide a mechanism by which the spreader can be easily and detachably secured to the wagon frame.

My invention consists in the construction, arrangement and combination of the various parts of the device, whereby the objects contemplated are attained, as hereinafter more fully set forth, pointed out in my claims and illustrated for the accompanying drawings, in which—

Figure 1 is a side elevation of the left side of a wagon with my spreader mounted on it after the box has been removed. Fig. 2 is a plan view of the forward end of the apron and upright plate connected to its forward end and also the crank mechanism for drawing it forwardly. Fig. 3 is a detail view of the cam actuated lever which is preferably on the right side of the machine designed to drive the shaft which operates the apron. Fig. 4 is a detail view of the operating lever for throwing the beater into and out of gear. Fig. 5 is a detail view of the cam and its attachments for operating the cam actuated lever, looking at it from the inside. Fig. 6 is a sectional view of the mechanism shown in Fig. 5. Fig. 7 is a rear elevation of my spreader. Fig. 8 is a longitudinal, sectional view of the rear portion of the spreader. Fig. 9 is a detail view of the spring which is connected to the shaft upon which the apron is wound. Fig. 10 is a side elevation of a rear end of the right side of my spreader. Fig. 11 is a side elevation of the rear end of my spreader looking at the left side of it with the sprocket chain removed and the rear wagon wheel removed, and Fig. 12 is a detail view of the upper end of one of the wagon stays to which my spreader is secured by means of a fastening device.

Referring to the accompanying drawings, I have used the reference numeral 10 to indicate the forward wheels of a wagon, and the numerals 11 and 12 to indicate the two rear wheels. These wheels are connected by the ordinary reach 13 and at the forward end and extending upwardly from the forward truck are the usual stays 14. Extending upwardly from the rear truck and on each side of it are the usual stays 15". The wagon box used with the truck has been removed and my spreader placed in position on the trucks in place thereof. This spreader is constructed in the following manner: The body of the spreader consists of a bottom 15, two sides 16 and 17 and the front portion 18. Mounted on the bottom 15 is an apron comprising the sprocket chains 19 and 20 which are connected by a series of cross bars 21, as shown clearly in Fig. 2. The forward bar of this series of cross bars, which for the purpose of convenience I have numbered 22, has attached to it two chains 23 and 24, which are set slightly inside of the end of the bar and out of line with the sprocket chains 19 and 20 and are thus arranged to prevent the sprocket wheels which drive the sprocket chains 19 and 20 from further advancing the apron when the ends of these chains 19 and 20 have been reached, as will be more fully set out hereinafter. Attached to the forward ends of these chains 23 and 24 is an upright plate 25 having an angular extension 26 designed to rest upon the bottom 15 of the body and to slide over said bottom when the apron is moved toward the rear or the forward end of the box. I have provided braces 27 between the rear of the upright plate and the angular extension 26 for supporting the upright plate 25 in its upright position.

Rotatably mounted and secured to the forward end 18 of the wagon body is a windlass 28 to which is secured at one end a rope 29, and at its other end this rope is secured to the central forward portion of the upright plate 25, so that as the windlass is turned in one direction, the rope will be wound upon it and the apron will be drawn toward the front of the body. It is by this windlass 28 that the apron is returned after the spreader has delivered its load. Secured to the side 17 of the body and adjacent to its forward end is a notched sector 30 having pivoted to its lower portion a lever 31 capable of being moved forwardly or rearwardly. Secured to the lever 31 is an ordinary hand latch 32, the lower end of which is designed to enter the notches in the notched sector 30 and to maintain said lever in various positions throughout its limit of movement, the purposes of this lever appear hereinafter. Adjacent to the rear end of the wagon body and secured to the sides 16 and 17 respectively are the posts 33 and 34, each extending from a point somewhat above the top of the sides to a point considerably below the sides.

Extending longitudinally of the sides 16 and 17 and near their rear ends are the shelves 35 and 36, which are rigidly braced by the braces 37 and 38 respectively, as clearly shown in Fig. 7. These shelves are designed to support certain parts of the operative mechanism and to prevent foreign substances elevated by the wheels 11 and 12 from getting into these operative mechanisms and clogging them. I have provided a metal plate 39 which is secured to the post 34 and the shelf 36 by bolts passing through angular extensions of this plate 39. The forward end of the shelf 36 is supported by means of the angle iron 40. The lower end of this angle iron 40 supports a bearing 41 for a sprocket wheel 42 which adjustably supports the forward end of one of the driving sprocket chains. This bearing is made adjustable by means of a screw 43 entering the bearing support 44 and the lower forward end of the angle iron 40. I also provide a metal plate 45 which is secured to the post 33 and the shelf 35 by bolts passing through angular extensions of this plate 45. The forward end of this shelf 35 is rigidly supported relative to the side 16 by means of an angle iron 46, which angle iron has mounted at its lower end a bearing 47 having a sprocket wheel 48 which adjustably supports the forward end of one of the driving chains on this side of the machine. This bearing is made adjustable by means of a screw 49 entering the bearing support 50 and the lower forward end of the angle iron 46.

Secured to the forward side of the post 34 and the top of the shelf 36 is a slotted angle iron 51. In the slot of this angle iron 51, I have placed a fastening bolt 52 having a right angled extension 53 at its lower end. This right angled extension 53 is designed to enter an opening 54 at the upper end of one of the wagon stays 15ᵃ and the nut 55 on the upper end of the bolt 52 is then screwed up to securely hold the body of the spreader in position relative to the trucks. The forward end of the right angled extension 53 is turned up at 56 to prevent its slipping out of the opening 54 and thus obviate any danger of the spreader slipping from the trucks. The slot in the angle iron 51 is designed to allow the bolt to move forwardly and rearwardly so to adapt my spreader for wagons varying somewhat in length. The opposite side of the body is held in position relative to the other stay 15 by means of a similar slotted angle iron which I have designated by the numeral 57 and a bolt 58 having the right-angled extension 59 and the upturned forward end 60 and the nut 61, all of which are similar in all respects to the similar parts on the bolt 52.

I have provided two driving sprocket wheels 62, one of which is designed to be detachably connected with the wheel 11 and the other of which is to be detachably connected with the wheel 12, as shown clearly in Fig. 1 of the drawings. Connecting the upper ends of the posts 33 and 34 is a retaining rack comprising the shaft 63 and the tines 64 designed to prevent the manure from being forced over the beater in large quantities as said beater is operated. Extending across the rear end of the spreader and connecting the metal portions of the rear central portions of the plates 39 and 45 is a shaft 65 having its left end 66 squared. On this shaft 65, I have mounted a cylinder comprising two plates 67 and 68, said plates being connected by a cylindrical beater 69. Mounted on the shaft 65 immediately outside of the plate 39 is a sprocket wheel 70 with a ratchet faced shoulder 71 on its outer side. Slidingly mounted outside of the ratchet faced shoulder 71 is a ratchet faced collar 72 having an annular groove 73 encircling it. This collar 72 is slidingly mounted on the squared end 66 of the shaft 65 and when the ratchet face of the collar 72 is held in engagement with the ratchet face of the shoulder 71 and the sprocket wheel 70 is driven, the beater will be operated to drive material over it.

Pivotally attached to the underside of the shelf 36 is an operating lever. The operating lever comprises an angular rod 74 having a downwardly extending member 75 connected with its rear end and having its lower end bifurcated to form the engaging members 76 and 77 which enter the annular groove 73 in the sliding collar 72 in such a way that as the lower end of the downwardly extending member 75 of the operating lever is moved outwardly and inwardly, the collar will be moved in a corresponding direction and yet at the same time, the collar will be allowed to rotate while the engaging members are in the annular groove. In the forward inner end of the operating lever, I have provided an opening 78 through which a chain 79 is attached. This chain is also attached at its lower end to the arm 80 of a bell-crank lever 81 which is secured to a shaft 82. The other arm 83 of the bell crank lever 81 is pivotally attached to a rod 84 connected with the lower end of the lever 31 at the forward side of the machine, so that when the lever 31 is drawn to its extreme forward limit of movement, the ratchet-faced collar 72 will be thrown out of engagement with the ratchet faced shoulder 71 and the beater will be thrown out of operation.

I have provided a spring 85 which is attached to the downwardly extending member 75 of the operating lever and also attached to the outside of the plate 39 so as to normally hold the lower end of the member 75 toward its inner limit of movement and the beater in gear. Mounted in the plates 39 and 45 beneath the shaft 65 is a shaft 86 on the left end of which are rotatably mounted the sprocket wheels 87 and 88 rigidly secured to each other. Passing around the sprocket wheel 70 and around the sprocket wheel 87 is a sprocket chain 89.

I have mounted a sprocket idler 90 on the post 34 a slight distance below the shelf 36. Passing around the sprocket wheels 42, 90 and 88 and in engagement with the upper portion of the adjacent sprocket wheel 62 is one of the main sprocket driving chains 91 so arranged that as the vehicle is advanced over the ground surface or as the wheel 11 is turned, the sprocket chain 91 and the wheels which it engages will be driven and the cylindrical beater will be driven to throw material over it when it is in gear. The shaft 82, above referred to, is mounted in the posts 33 and 34 and extends across the rear end of the machine. Securely attached to the right end of the shaft 82 is a crank arm 92 having an opening in its lower end through which the chain 93 is secured to the lower end of the arm 92. Extending across the rear end of the spreader and immediately beneath the bottom 15 of it, is a shaft 94 on which is mounted two sprocket wheels 95, over which pass the sprocket chains 19 and 20 of the apron. Rotatably mounted between the plates 39 and 45 and below the shaft 94 is a shaft 96 which has a sprocket wheel 97, at each end of it to which are secured the rear ends of the sprocket chains 19 and 20 of the apron. There is a spring 98 secured to the shaft 96 and to the plate 45 which assists in winding the apron around the shaft 96 as it is advanced rearwardly. As the shaft 94 is driven, the apron is moved rearwardly and its weight as it passes over the shaft 94 and down one side of the shaft 96 tends to largely rotate the said shaft 96 and with the assistance of a spring 98, this winding operation is completely performed. The spring 98 is wound up as the apron is drawn forwardly by means of the windlass 28.

Secured between the plates 39 and 45, I have provided a curved plate 99 beneath the forward portion of the cylindrical beater to prevent foreign substances from getting into the apron as it is being wound around the shaft 96. Mounted on the right end of the shaft 94 is a ratchet 100 having the retaining pawl 101, which is pivotally secured to the post 33, in engagement with the ratchet and is designed to prevent its rotating in one direction.

Pivoted on the shaft 94 and immediately inside of the ratchet 100 is a driving arm 102, which is connected with the arm 92 by means of the chain 93, above referred to, so that as the arm 92 is moved forwardly at its lower end, the driving arm 102 will also be moved in the same direction. This driving arm has a roller 103 mounted at its outer end and at substantially right angles to its body portion. Mounted on the arm 102 is a driving pawl 104 having the spring 105 connected with it and with the arm for maintaining this pawl in driving engagement with the ratchet 100 so that as the driving arm is moved forwardly a certain distance, the ratchet 100, the shaft 94 and its attachments are driven a certain predetermined distance. I have provided a coil spring 106 secured to the outside of the plate 45 and the driving arm 102 for maintaining its lower end at its rear limit of movement which is controlled through the arm 92 and its attachments by the lever 31.

Rotatably mounted on the outer end of the shaft 86 is a sprocket wheel 107 having mounted immediately inside of it and secured to it an internal gear 108. Mounted beside the internal gear 108 is a cam 109. Connected with the cam is a pawl bearing member 110 having the pawls 111 and 112 secured to its ends and pressed outwardly, by the springs 113 and 114 respectively, into engagement with the teeth of the internal gear 110 so that as the sprocket wheel is driven in the direction of the arrow, shown in Fig. 10, (which is the normal direction when the wagon is being moved forwardly), the cam will be driven on account of the engagement of the pawls 111 and 112 with the teeth of the internal gear 108. When, however, the ratchet is driven in the opposite direction by the backing of the vehicle, the ratchet will slide over the teeth of the internal gear and the cam will remain stationary. I have provided a sprocket idler 115 on the post 33. Passing around the sprockets 107 and 115 and 48 and having its under surface constantly in engagement with the wheel 62 on the right side of the machine is a sprocket chain 116 so arranged that as the vehicle is advanced forwardly, the gear 107 and its attachments will be driven in the same direction. As the cam 109 is rotated in the manner above referred to, it will engage the roller 103 on the driving arm and will consequently cause the ratchet wheel 100 to be driven a certain distance and will hence cause the apron to be moved rearwardly a certain distance. The distance through which the apron is driven is determined by the length of the stroke of the driving arm as it is forced forwardly by the cam and as the driving arm is controlled by the lever 31, the length of the stroke of the driving arm can be regulated from the lever 31. When the lever 31 is moved forwardly to its extreme limit of movement, the cam will not engage the roller 103 and hence the apron will be thrown entirely out of operation as well as the beater.

In practical operation, the use of a single lever for accomplishing the three results is very advantageous as well as the constructing of the parts, as herein set out. The securing of the device through the trucks of an ordinary wagon and the protection of the operative parts also effect a very advantageous result and assist very materially in making the construction permanently operative.

Having thus described my invention, what I claim and desire to secure by Letters Patent of the United States, therefore is—

1. In a spreader, a body, a post on each side of the body and near the rear end thereof extending from a point above the side, to which it is attached, to a point considerably below it, a metal plate secured to each post and to the side adjacent to it to form a rigid rear end to the spreader, an apron mounted in the bottom of the spreader, an adjustable bolt having an angle extension on its lower end for securing the spreader to the stays of the ordinary wagon trucks.

2. In a spreader, a body, a post on each side of the body and near the rear end thereof extending from a point above the side, to which it is attached, to a point considerably below it, a metal plate secured to each post and to the side adjacent to it, to form a rigid rear end to the spreader, an apron mounted in the bottom of the spreader, a sprocket bearing shaft for driving the apron, a driving arm and ratchet mounted on the outer end of the sprocket bearing shaft, a spring maintained pawl mounted on the driving arm, designed to engage the ratchet and to drive it as the driving arm is moved forwardly at its lower end, a retaining pawl in engagement with the ratchet, a spring for maintaining the driving arm at its rearward limits of movement, a cam for operating the driving arm intermittently, and means for operating the cam.

3. In a spreader, a body, a post on each side of the body and near the rear end thereof extending from a point above the side, to which it is attached, to a point considerably below it, a metal plate secured to each post and to the side adjacent to it to form a rigid rear end to the spreader, an apron mounted in the bottom of the spreader, a sprocket bearing shaft for driving the apron, a driving arm and a ratchet mounted on the outer end of the sprocket bearing shaft, a spring maintained pawl mounted on the driving arm, designed to engage the ratchet and to drive it as the driving arm is moved forwardly at its lower end, a retaining pawl in engagement with the ratchet, a spring for maintaining the driving arm at its rearward limits of movement, a cam for operating the driving arm intermittently, means for operating the cam, and means connected with the lower end of the driving arm for regulating its distance from the shaft on which the cam is mounted.

4. In a spreader, a body, a post on each side of the body and near the rear end thereof extending from a point above the side, to which it is attached, to a point considerably below it, a metal plate secured to each post and to the side adjacent to it to form a rigid rear end to the spreader, an apron mounted in the bottom of the spreader, a sprocket bearing shaft for driving the apron, a driving arm and a ratchet mounted on the outer end of the sprocket bearing shaft, a spring maintained pawl mounted on the driving arm, designed to engage the ratchet and to drive it as the driving arm is moved forwardly at its lower end, a retaining pawl in engagement with the ratchet, a spring for maintaining the driving arm at its rearward limits of movement, a cam for operating the driving arm intermittently, means for operating the cam, means connected with the lower end of the driving arm for regulating its distance from the shaft on which the cam is mounted, said means comprising a shaft, a crank arm mounted on one end of the shaft, a chain connecting the lower end of the crank arm with the driving arm, and a bell crank lever mounted on the other end of the shaft, a rod connected with one end of the bell crank lever, and an operating lever connected with the other end of said rod.

5. In a spreader, a body, a post on each side of the body and near the rear end thereof extending from a point above the side, to which it is attached, to a point considerably below it, a metal plate secured to each post and to the side adjacent to it to form a rigid rear end to the spreader, an apron mounted in the bottom of the spreader, a sprocket bearing shaft for driving the apron, a driving arm and a ratchet mounted on the outer end of the sprocket bearing shaft, a spring maintained pawl mounted on the driving arm, designed to engage the ratchet and to drive it as the driving arm is moved forwardly, its lower end, a retaining pawl in engagement with the ratchet, a spring for maintaining the driving arm at its rearward limits of movement, a cam for operating the driving arm intermittently, means for operating the cam, means connected with the lower end of the driving arm for regulating its distance from the shaft on which the cam is mounted, a rotary beater mounted at the rear end of the body, a spring for normally maintaining the beater in gear, and a lever for throwing the beater out of gear.

6. In a spreader, an apron, means for moving the apron intermittently, springing means for winding the apron around a shaft, a curved shield for preventing the substance in the spreader from getting into the apron when it is being wound up, a beater above the shield, means for drawing the apron toward its forward limit of movement, means for driving the rotary beater, a lever operated mechanism for throwing the intermittent driving mechanism and the rotary beater out of operation, a retaining device mounted above the rotary beater, and adjustable means for detachably securing the spreader to a wagon truck.

HOWARD F. SNYDER.

Witnesses:
W. H. A. THOMAS,
T. A. MOLER.